United States Patent
Huang et al.

(10) Patent No.: US 8,837,145 B2
(45) Date of Patent: Sep. 16, 2014

(54) BATTERY EJECTING STRUCTURE WITH PAD FUNCTION FOR PORTABLE ELECTRONIC DEVICE

(75) Inventors: Chi-Min Huang, New Taipei (TW); Yao-Ting Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 315 days.

(21) Appl. No.: 13/310,374

(22) Filed: Dec. 2, 2011

(65) Prior Publication Data

US 2013/0016458 A1    Jan. 17, 2013

(30) Foreign Application Priority Data

Jul. 13, 2011   (TW) .............................. 10022851 U

(51) Int. Cl.
  *G06F 1/16* (2006.01)
  *H01M 2/10* (2006.01)
  *H04M 1/00* (2006.01)

(52) U.S. Cl.
  USPC ................... 361/679.58; 361/679.55; 429/97; 429/99; 429/100; 455/575.1; 455/575.8

(58) Field of Classification Search
  USPC ............. 361/679.01–679.45, 679.55–679.59; 429/97, 99, 100; 455/575.1, 575.8
  See application file for complete search history.

(56) References Cited

U.S. PATENT DOCUMENTS

| 7,095,607 | B2 * | 8/2006 | Imamura ................... 361/679.57 |
| 7,531,268 | B2 * | 5/2009 | Huang .............................. 429/97 |
| 8,252,445 | B2 * | 8/2012 | Chu ............................... 429/100 |
| 8,531,823 | B2 * | 9/2013 | Ho ........................... 361/679.01 |
| 8,551,634 | B2 * | 10/2013 | Zhu et al. ......................... 429/97 |
| 2009/0303668 | A1 * | 12/2009 | Zhao et al. ................ 361/679.01 |
| 2010/0086840 | A1 * | 4/2010 | Shao ............................... 429/97 |
| 2013/0017698 | A1 * | 1/2013 | Cheng et al. .................. 439/159 |

* cited by examiner

*Primary Examiner* — Nidhi Desai
(74) *Attorney, Agent, or Firm* — Muncy, Geissler, Olds & Lowe, P.C.

(57) ABSTRACT

A battery ejecting structure with the pad function is applied to a portable electronic device which comprises a housing and a battery. The battery ejecting structure of the present invention comprises a pad, a pushing element and a blocking element. The pad is located movably in a container of the housing and comprises a fixed member. The pushing element is located in the housing, and the fixed member of the pad is connected to the pushing element through the housing. The pushing element comprises a lock structure for locking the battery in an initial position. The blocking element is located movably in the container next to the pad. While the blocking element is disengaged from the container, the pushing element is moved from the initial position to a release position by the movement of the pad to unlock the battery.

12 Claims, 9 Drawing Sheets

BATTERY EJECTING STRUCTURE WITH PAD FUNCTION FOR PORTABLE ELECTRONIC DEVICE

BACKGROUND OF THE INVENTION

1. Field of the Invention

The present invention relates to a battery ejecting structure of a portable electronic device; more particularly, to a battery ejecting structure which combines a foot pad function and a battery module removing function.

2. Description of the Related Art

Generally, a battery module is located in a portable electronic device, and there is also a battery module ejecting structure on the bottom of the portable electronic device, so an user may change the battery module via the battery module ejecting structure. However, a foot pad and the battery module ejecting structure only have one single function respectively, and they are independently located on the bottom of the portable electronic device, so as to reduce the available space of the bottom and to increase the amount of necessary elements. Therefore, the design of all the element position of the portable electronic device may be affected, and the manufacturing cost may be increased.

SUMMARY OF THE INVENTION

It is an main object of the present invention to provide a battery ejecting structure which combines a foot pad function and a battery module removing function.

It is another object of the present invention to provide a portable electronic device which applies the battery ejecting structure with the pad function.

To achieve the abovementioned object, the battery ejecting structure with a pad function is applied to a portable electronic device which comprises a housing and a battery. The battery ejecting structure of the present invention comprises a pad, a pushing element and a blocking element. The pad is located movably in a container of the housing and comprises a fixed member. The pushing element is located in the housing, and the fixed member of the pad is connected to the pushing element through the housing. The pushing element comprises a lock structure for locking the battery in an initial position. The blocking element is located movably in the container next to the pad. While the blocking element is disengaged from the container, the pushing element is moved from the initial position to a release position by the movement of the pad to unlock the battery.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

The battery ejecting structure with the pad function of the present invention is applied to a portable electronic device, and the portable electronic device is a notebook in the following embodiments. However, the present invention is not limited to the application, the portable electronic device can also be a mini notebook, a tablet computer, a smartphone, a PDA or other similar electronic device.

Figure 1:
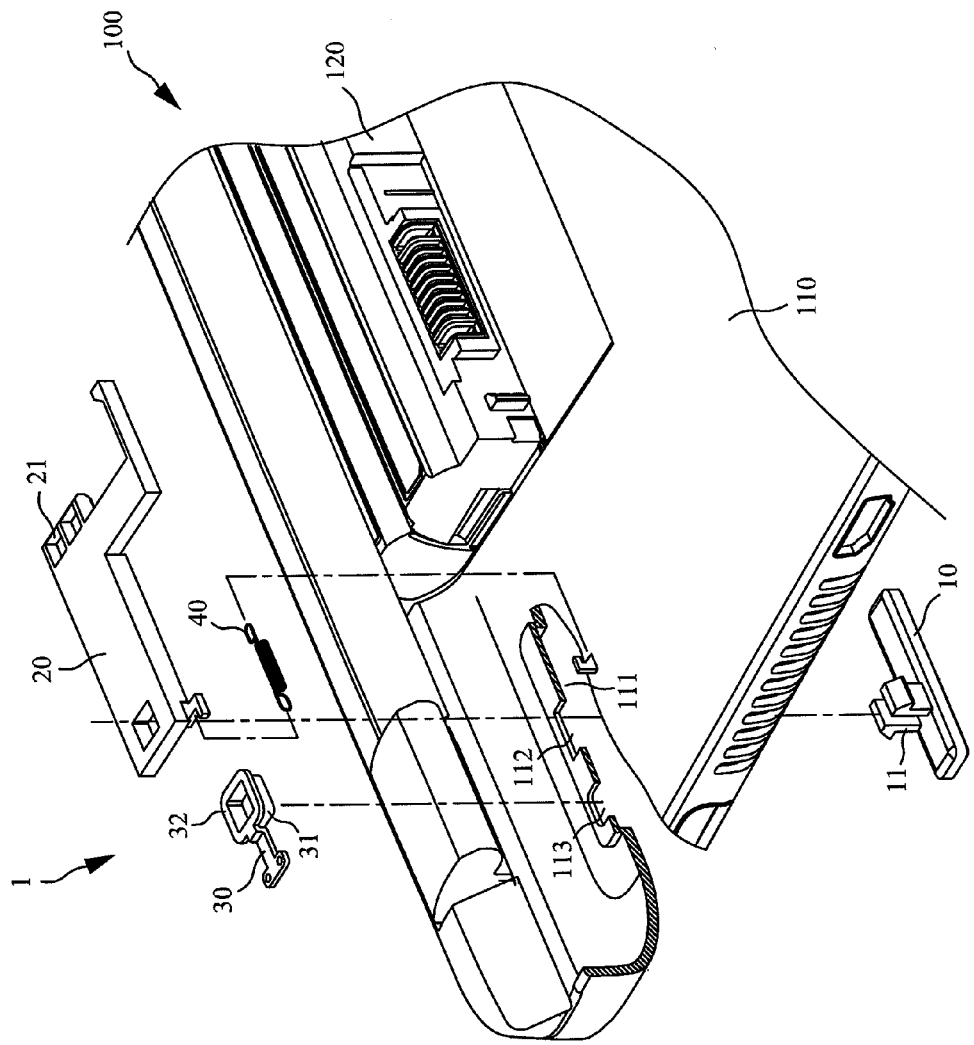
FIG. 1 illustrates an exploded perspective view of the battery ejecting structure with the pad function according to the first embodiment of the present invention.
Figure 2:
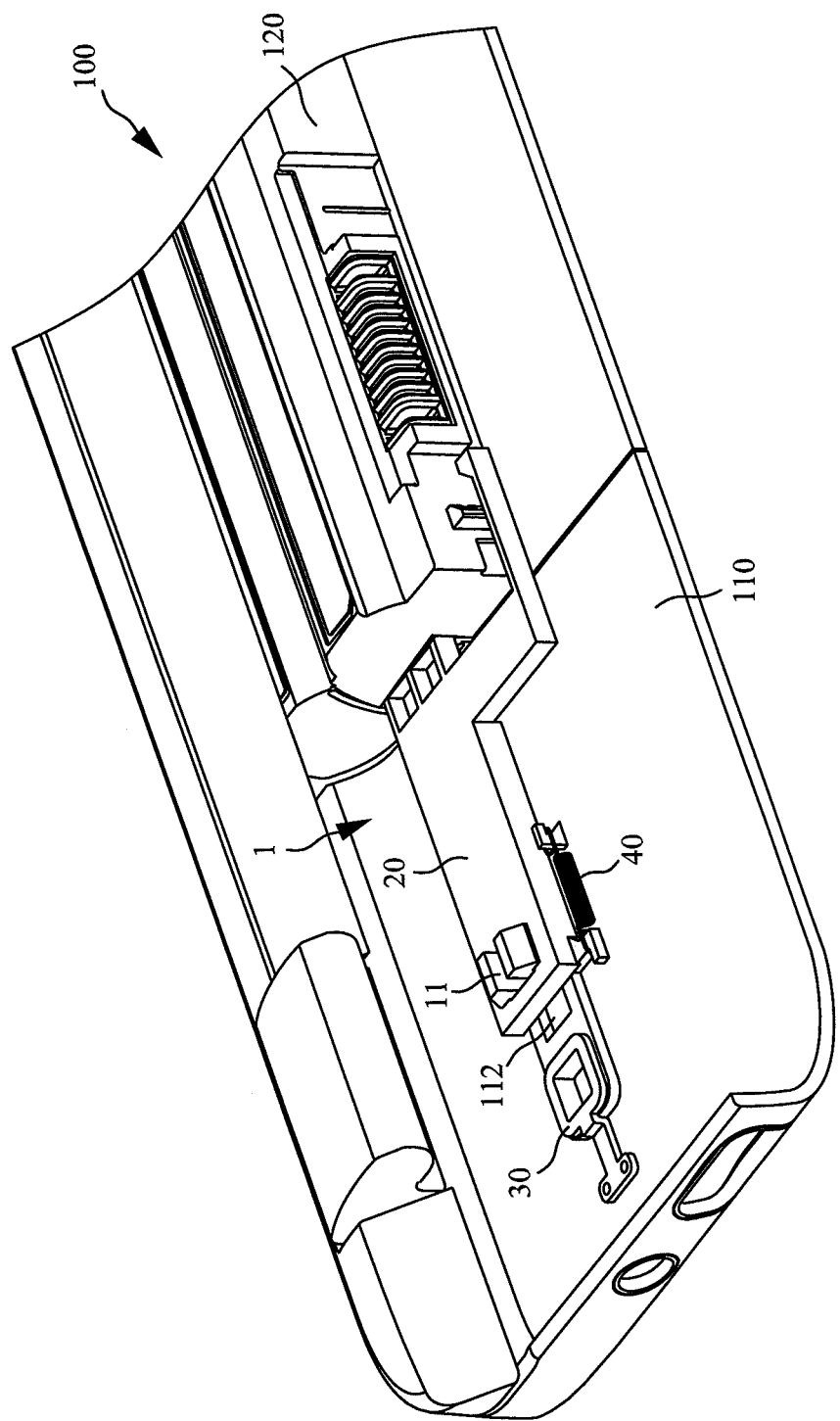
FIG. 2 illustrates a combination schematic drawing of the battery ejecting structure with the pad function according to the first embodiment of the present invention.

Please refer to FIG. 1 and FIG. 2. FIG. 1 illustrates an exploded perspective view of the battery ejecting structure 1 with the pad function according to the first embodiment of the present invention. FIG. 2 illustrates a combination schematic drawing of the battery ejecting structure 1 with the pad function according to the first embodiment of the present invention.

As shown in FIG. 1 and FIG. 2, the portable electronic device 100 comprises a housing 110 and a battery 120. The housing 110 comprises a container 111 which formed on the external surface of the housing 111, and the container 111 comprises a slide hole 112. The battery 120 is located in the housing 110 next to the container 111.

In the first embodiment of the present invention, the battery ejecting structure 1 with the pad function comprises a pad 10, a pushing element 20 and a blocking element 30. The pad 10 is located movably in the container 111 of the housing 110, and the pad 10 comprises a fixed member 11. The fixed member 11 passes through the slide hole 112 of the container 111 and may slide along the slide hole 112, allowing the pad 10 to move in the container 111 relative to the housing 110.

In this embodiment, the pad 10 is made of hard plastic materials (such as plastic) and flexible elastic materials (such as rubber), and it is formed by a co-injection molding method to be integral. Wherein the side of the pad 10 comprising the fixed member 11 and inwards the container 111 is made of the plastic materials, to provide stable combination; the side of the pad 10 outwards the container 111 is made of the elastic materials, to provide buffering function.

The pushing element 20 is located in the housing 110 and connected to the fixed member 11 of the pad 10 through the housing 110, such that the movement of the pad 10 may bring the pushing element 20 to move together. The pushing element 20 comprises a locking structure 21 used for locking the battery 120.

The blocking element 30 which is located in the container 111 next to the pad 10 is made of the elastic materials. Generally, the blocking element 30 is used for limiting the movement of the pad 10 in the container 111. In this embodiment, one end of the blocking element 30 is connected to the housing 110, and the connecting point of the blocking element 30 and the housing 110 forms a pivot. The main body 31 of the blocking element 30 passes through the hole 113 to be located in the container 111, such that when the blocking element 31 is applied by a force (such as user pushes), the blocking element 30 takes the pivot to move to the relative internal direction of the housing 110. The blocking element 30 may be connected to the housing 110 by hot melting, welding or other methods, but the present invention is not limited to the design. Furthermore, the blocking element 30 comprises a restricting structure 32 near the main body 31, the restricting structure 32 is used for preventing the blocking element 30 to be disengaged outward the hole 113 by the housing 110 holding the restricting structure 32.

The battery ejecting structure 1 with the pad function of the present invention further comprises an elastic element 40. Two ends of the elastic element 40 are connected to the pushing element 20 and the housing 110 respectively, and the elastic element 40 is used for allowing the pushing element 20 to return to the original position automatically.

Figure 3:
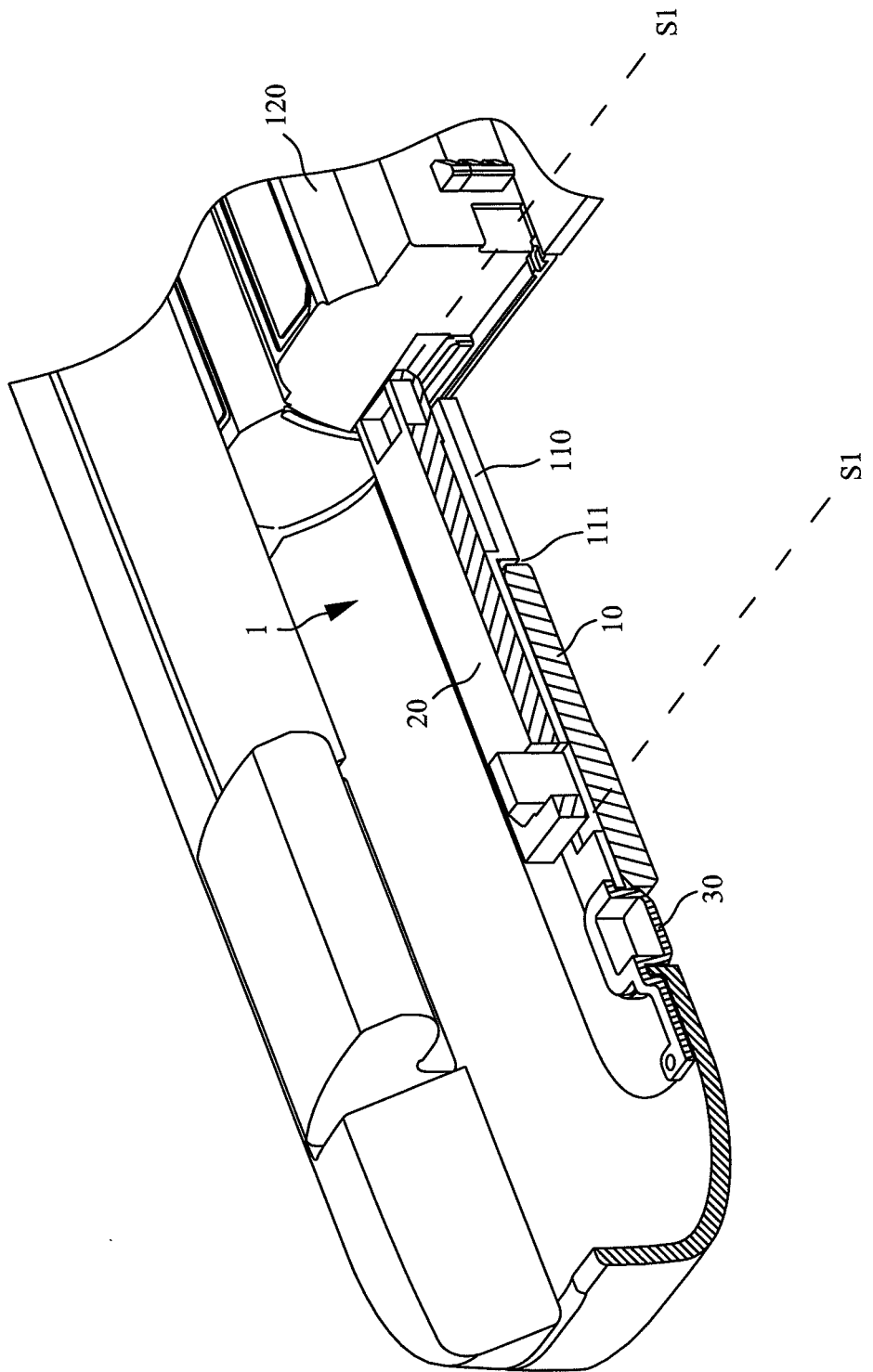
FIG. 3 illustrates a schematic drawing of the battery ejecting structure with the pad function in a battery locking state according to the first embodiment of the present invention.
Figure 4:
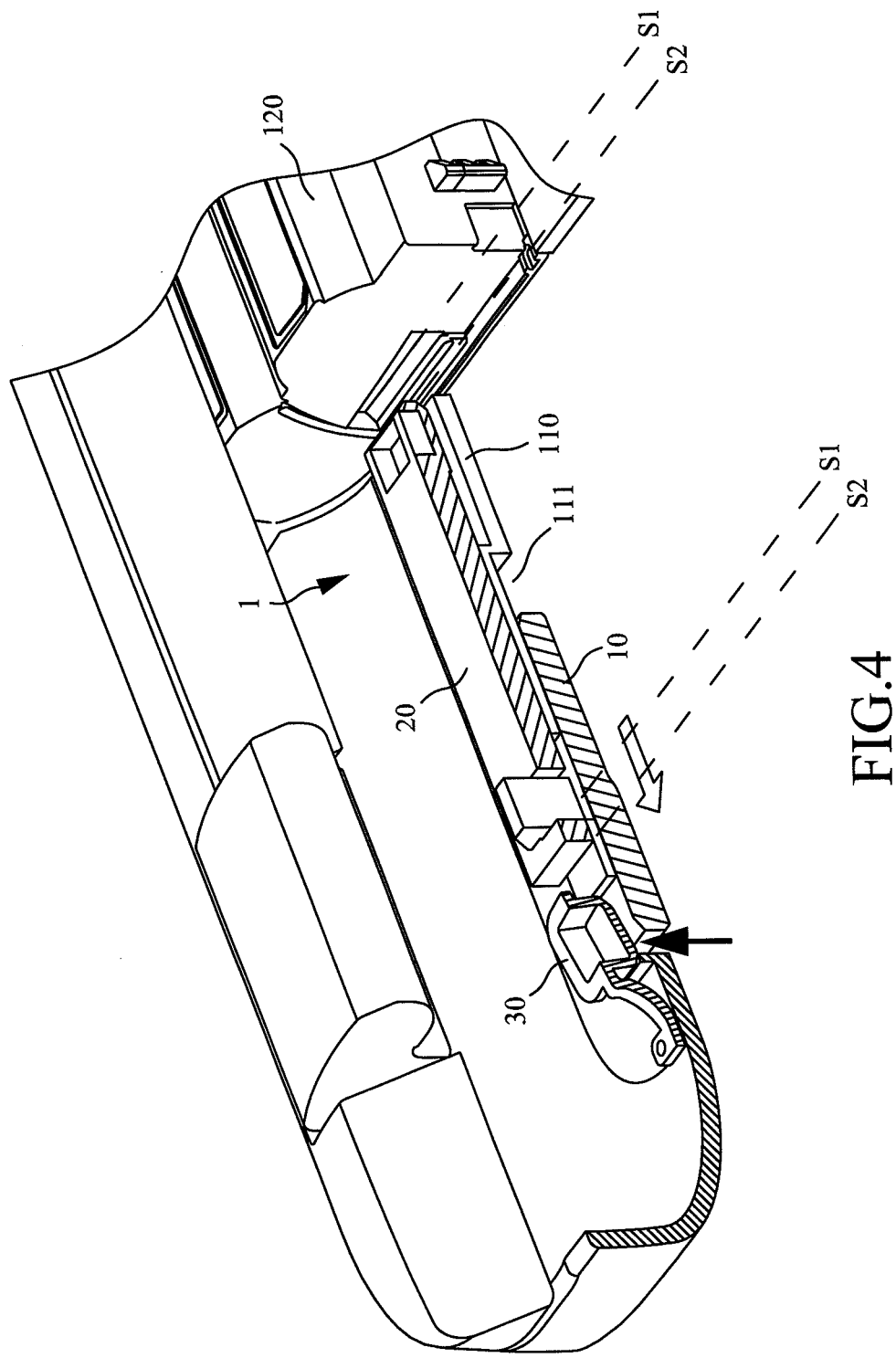
FIG. 4 illustrates a schematic drawing of the battery ejecting structure with the pad function in a battery unlocking state according to the first embodiment of the present invention.

Please refer to FIG. 3 and FIG. 4. FIG. 3 illustrates a schematic drawing of the battery ejecting structure 1 with the pad function in locking battery state according to the first embodiment of the present invention. FIG. 4 illustrates a schematic drawing of the battery ejecting structure 1 with the pad function in unlocking battery state according to the first embodiment of the present invention.

As shown in FIG. 3, generally the pushing element 20 is in an initial position S1, and the pushing element 20 locks the battery 120 via the locking structure 21; meanwhile, the blocking element 30 is in the container 111, the pad 10 is restricted to move in the container 111 by the blocking element 30, so as to prevent the pad 10 to move by an external force to unlock the battery 120.

As shown in FIG. 4, if users want to unlock the battery 120, users may apply a force to the blocking element 30 towards the inside of the housing 110 (such as pushing the blocking element 30 into the housing 110); after being applied by the force, the blocking element 30 takes the pivot and moves relative to the housing 110 to the inside of the housing 110, and disengages from the container 111. While the blocking element 30 disengages from the container 111, the blocking element 30 removes the movement restricting of the pad 10; therefore, users may operate the pad 10 to move towards the original position of the blocking element 30, and brings the pushing element 20 to move from the initial position S1 to a release position S2; such that the locking structure 21 of the pushing element 20 is removed from the battery 120 to unlock the battery 120, and users may take the battery 120 away from the bottom of the housing 110.

While users don't apply a force to the pad 10 to move it, the pushing element 20 is pulled to return to the initial position S1 from the release position S2 by the elastic restoring force of the elastic element 40, and brings the pad 10 to return to the state before moving; meanwhile, the blocking element 30 takes the pivot to return to the original position in the container 111 from the disengaging position via its own elastic restoring force, and to restrict the pad 10 moving again.

Figure 5:
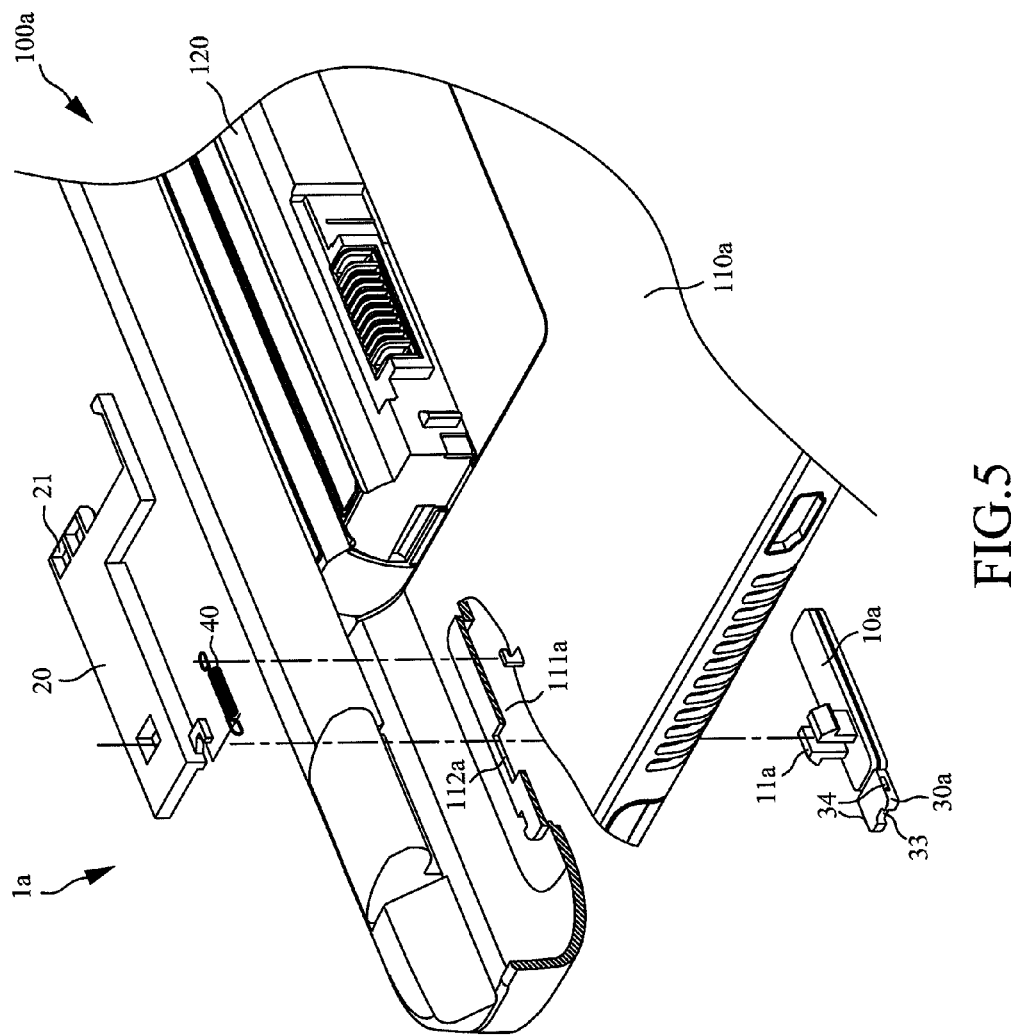
FIG. 5 illustrates an exploded perspective view of the battery ejecting structure with the pad function according to the second embodiment of the present invention.
Figure 6:
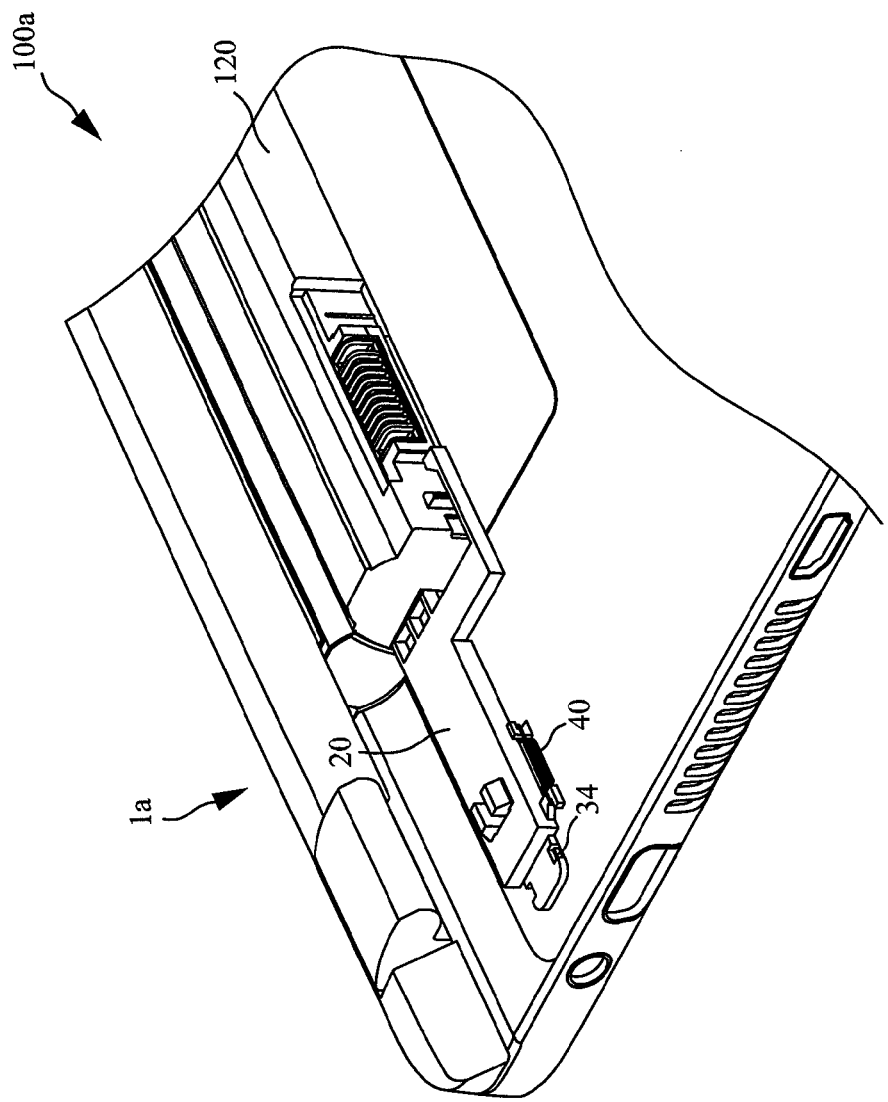
FIG. 6 illustrates a combination schematic drawing of the battery ejecting structure with the pad function according to the second embodiment of the present invention.

Please refer to the FIG. 5 and FIG. 6. FIG. 5 illustrates an exploded perspective view of the battery ejecting structure 1a with the pad function according to the second embodiment of the present invention. FIG. 6 illustrates a combination schematic drawing of the battery ejecting structure 1a with the pad function according to the second embodiment of the present invention.

The second embodiment of the present invention is based on the first embodiment to change the design of the pad and the blocking element. As shown in FIG. 5 and FIG. 6, in the second embodiment of the present invention, the battery ejecting structure 1a with the pad function is applied to a portable electronic device 100a, the battery ejecting structure 1a comprises a pad 10a, a pushing element 20 and a blocking element 30a. The pad 10a and the blocking element 30a are made of hard plastic materials and elastic materials, and they are formed by a co-injection molding method to be integral. Wherein the side of the pad 10a comprising the fixed member 11a and inwards the container 111a is made of the plastic materials, to provide stable combination; the side of the pad 10 outwards the container 111a and the blocking element 30a are made of the elastic materials, to provide buffering function.

In this embodiment, one end of the blocking element 30a is connected to the pad 10a, and the connecting point of the blocking element 30a and the pad 10a forms a pivot, such that while the blocking element 30a is applied by the external force (such as users push), the blocking element 30a takes the pivot to move towards the outside of the housing 110 relative to the pad 10a. The blocking element 30a comprises a recess 33 located on any side of the pad 10a next to the container 111a, allowing users to apply the force to the blocking element 30a via the recess 33, to allow the blocking element 30a to be disengaged from the container 111a.

To prevent the blocking element 30a disengaging from the container 111a in common state, in this embodiment, the blocking element 30a further comprises at least one fastening structure 34. The at least one fastening structure 34 is located on at least one side of the blocking element 30a next to the container 111a, and the at least one fastening structure 34 may combine at least one corresponding structure disposed on the housing 110a to fasten the blocking element 30a while the blocking element 30a is not applied by the external force.

Figure 7:
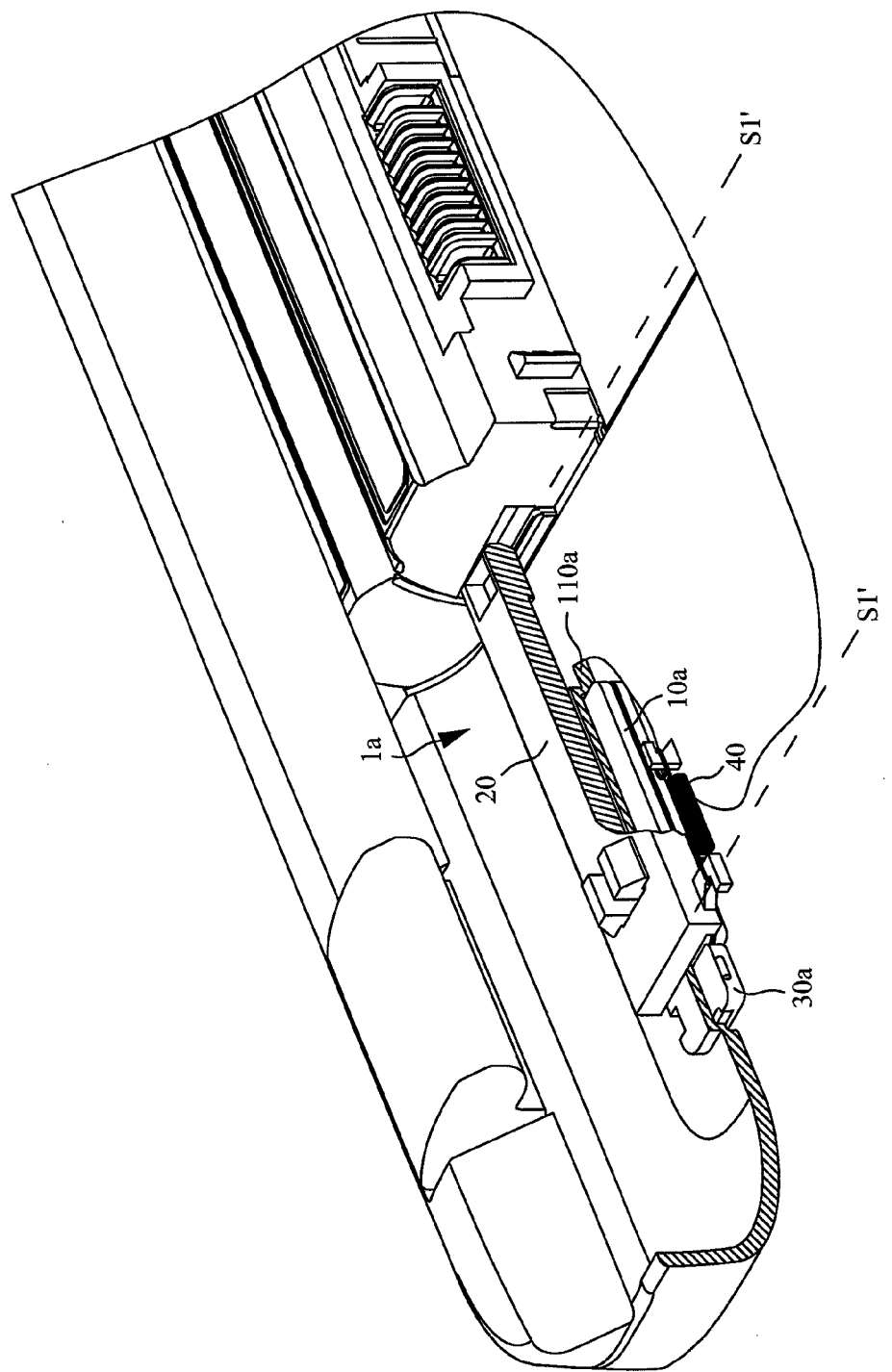
FIG. 7 illustrates a schematic drawing of the battery ejecting structure with the pad function in a battery locking state according to the second embodiment of the present invention.
Figure 8:
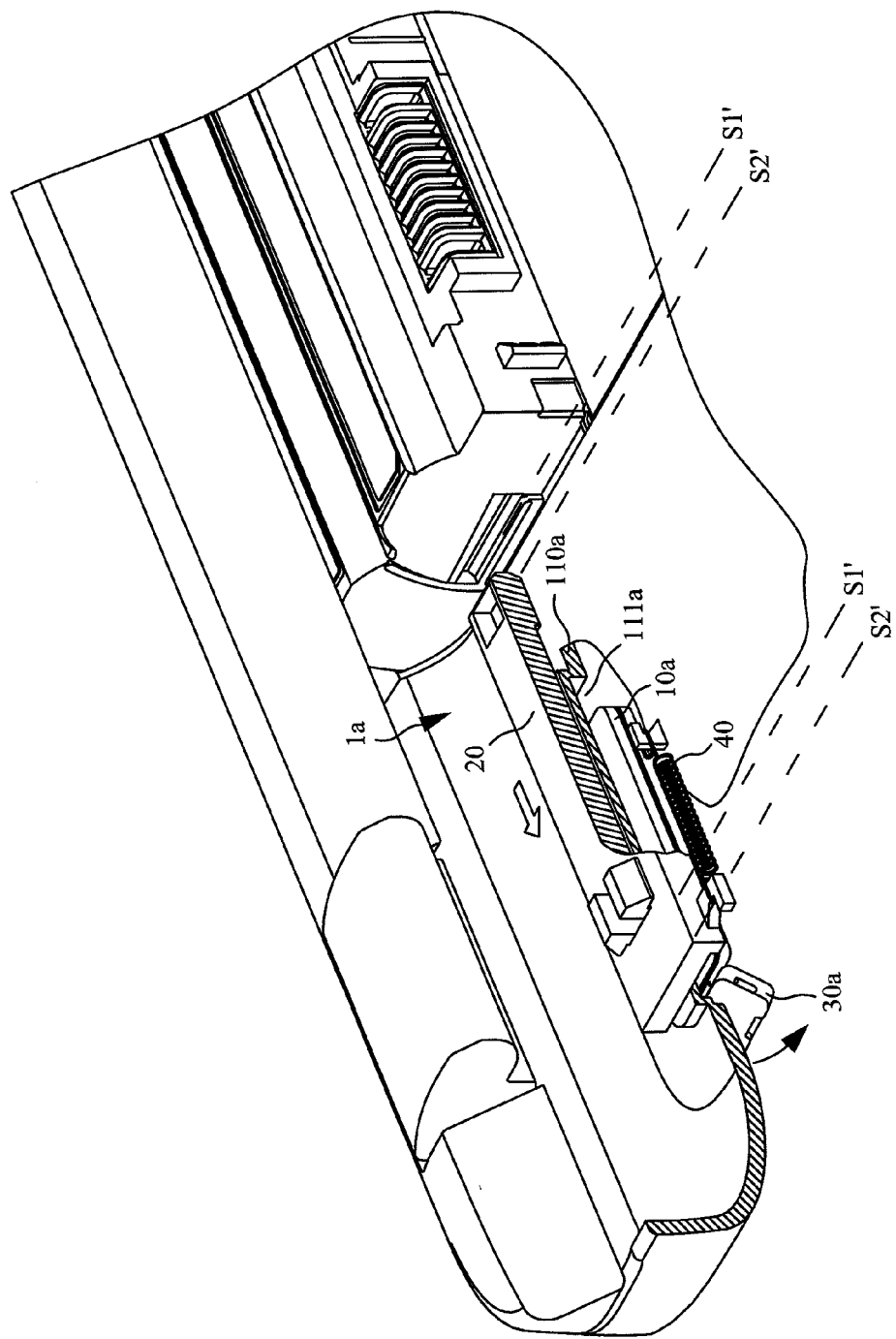
FIG. 8 illustrates a schematic drawing of the battery ejecting structure with the pad function in a battery unlocking state according to the second embodiment of the present invention.

Please refer to the FIG. 7 and FIG. 8. FIG. 7 illustrates a schematic drawing of the battery ejecting structure 1a with the pad function in locking battery state according to the second embodiment of the present invention. FIG. 8 illustrates a schematic drawing of the battery ejecting structure 1a with the pad function in unlocking battery state according to the second embodiment of the present invention.

As shown in FIG. 7, the battery ejecting structure 1a with the pad function in common state works as same as the first embodiment, the pushing element 20 is in the initial position S1', and the locking structure 21 of the pushing element 20 locks the battery 120; meanwhile, the blocking element 30a is in the container 111a, the pad 10a is restricted to move in the container 111a by the blocking element 30a, so as to prevent the pad 10a to move by the external force to unlock the battery 120.

As shown in FIG. 8, if users want to unlock the battery 120, users may apply a force to the blocking element 30a (such as using fingers towards the outside of the housing 110a to push the blocking element 30a via the recess 33); the blocking element 30 takes the pivot to move towards the outside of the housing 110a, and disengages from the container 111a. While the blocking element 30a disengages from the container 111a, the blocking element 30a removes the movement restricting of the pad 10a; therefore, users may operate the pad 10 to move towards the original position of the blocking element 30a, and brings the pushing element 20 to move from the initial position S1' to the release position S2'; such that the locking structure 21 of the pushing element 20 is removed from the battery 120 to unlock the battery 120, and users may take the battery 120 away from the bottom of the housing 110*a*.

While users don't apply any force to the pad 10*a* to move it, the pushing element 20 is pulled to return to the initial position S1' from the release position S2' by the elastic restoring force of the elastic element 40 as the abovementioned embodiment, and brings the pad 10*a* to return to the state before moving; meanwhile, the blocking element 30*a* takes the pivot to return to the original position in the container 111*a* from the disengaging position via its own elastic restoring force or a force applied by users, and the at least one fastening structure 34 fastens the blocking element 30*a* in the container 111*a* to restrict the pad 10 moving again.

Accordingly, the battery ejecting structure 1 or 1*a* with the pad function may be taken as the foot pad in common state, and the blocking element 30 or 30*a* may prevent the pad 10 or 10*a* to be moved; while changing the battery, users just move the blocking element 30 or 30*a* and push the pad 10 or 10*a* to unlock the battery 120.

Furthermore, the portable electronic device 100 or 100*a* of the present invention comprises the housing 110 or 110*a*, the battery 120 and the battery ejection structure 1 or 1*a* with the pad function as above-mentioned description. The housing 110 or 110*a* comprises the container 111 or 111*a* used for containing the corresponding battery ejection structure 1 or 1*a* thereof; the battery 120 is located in the housing 110 or 110*a* next to the container 111 or 111*a*, allowing the battery ejection structure 1 or 1*a* with the pad function to lock or unlock the battery 120. The related structure and operating method are as same as the abovementioned battery ejection structure 1 or 1*a* with the pad function thereof, there is no need for further description.

Figure 9:
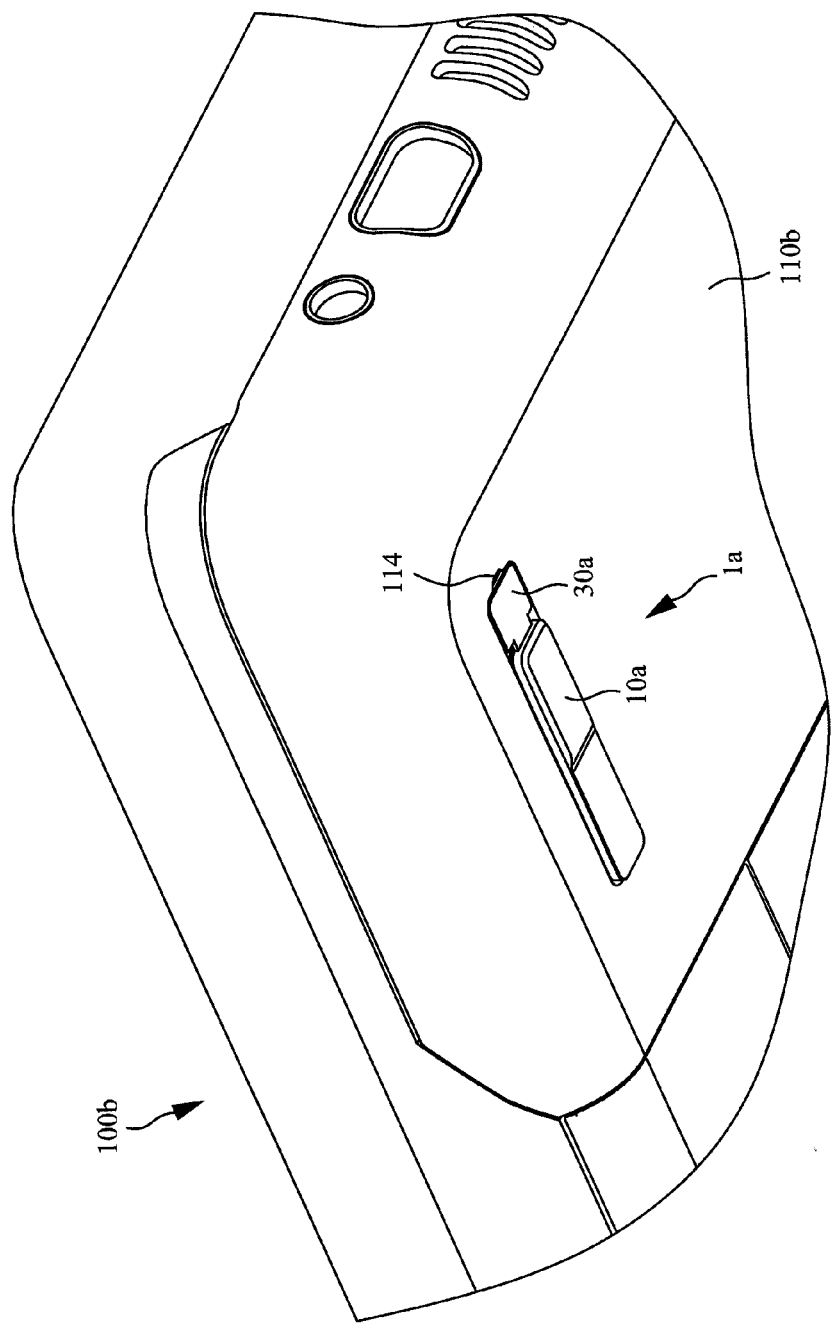
FIG. 9 illustrates a partial schematic drawing of the portable electronic device according to one embodiment of the present invention.

Please refer to FIG. 9, which illustrates a partial schematic drawing of the portable electronic device 100*b* according to one embodiment of the present invention. As shown in FIG. 9, besides using the recess 33 of the battery ejection structure 1*a* with the pad function in the second embodiment, in one embodiment of this invention for the portable electronic device 100*b*, the container 111*b* of the housing 110*b* comprises a recessed structure 114, and the recessed structure 114 is located on one side of the container 111*b* next to the blocking element 30*a*. The users may apply the force to the blocking element 30*a* via the recessed structure 114, allowing the blocking element 30*a* to disengage from the container 111*b*, but the present invention is not limited to the design.

Furthermore, the portable electronic device may depend on the design or require increasing the amount of the container and battery ejecting structure with pad function, but the amount of the container and battery ejecting structure is not limited to the abovementioned embodiment.

Although the present invention has been explained in relation to its preferred embodiments, it is to be understood that many other possible modifications and variations can be made without departing from the spirit and scope of the invention as hereinafter claimed.

What is claimed is:

1. A battery ejecting structure with a pad function applied to a portable electronic device, the portable electronic device comprising a housing and a battery, the battery ejecting structure comprising: a pad, located movably in a container of the housing, the pad comprising a fixed member; a pushing element, located in the housing, the fixed member of the pad being connected to the pushing element through the housing, the pushing element comprising a locking structure, allowing the pad to lock the battery via the locking structure while the pushing structure being in an initial position; and a blocking element, wherein an end of the blocking element is connected to the pad, the blocking element takes a connecting point of the blocking element and the pad as the pivot, moves towards an outside of the housing and disengage from the container while a force is applied to the blocking element; wherein when the blocking element is disengaged from the container, the pushing element is moved from the initial position to a release position by the movement of the pad to unlock the battery.

2. The battery ejecting structure as claimed in claim 1, wherein the pad and the blocking element are formed by the co-injection molding method to be integral, a side of the pad which comprises the fixed member and inwards the container is made of the plastic material; another side of the pad outwards the container is made of the elastic material.

3. The battery ejecting structure as claimed in claim 1, further comprising an elastic element, two ends of the elastic element being connected to the pushing element and the housing respectively, and the pushing element being returned to the initial position from the release position by an elastic restoring force of the elastic element.

4. The battery ejecting structure as claimed in claim 1, wherein the blocking element comprises a recess located on a side of the blocking element next to the container, the recess is used for facilitating a user to apply the force to the blocking element to disengage from the container.

5. The battery ejecting structure as claimed in claim 1, wherein the blocking element is made of the elastic material.

6. The battery ejecting structure as claimed in claim 1, wherein the blocking element comprises at least one fastening structure, the at least one fastening structure is located correspondingly on at least one side of the blocking element, and the blocking element is fastened in the container via the at least one fastening structure while the force is not applied to the blocking element.

7. A portable electronic device, comprising: a housing comprising a container; a battery, located in the housing; and a battery ejecting structure, comprising: a pad, located movably in the container of the housing, the pad comprising a fixed member; a pushing element, located in the housing, the fixed member of the pad being connected to the pushing element through the housing, the pushing element comprising a locking structure, allowing the pad to lock the battery via the locking structure while the pushing structure being in an initial position; and a blocking element, wherein an end of the blocking element is connected to the pad, the blocking element takes a connecting point of the blocking element and the pad as the pivot, moves towards an outside of the housing and disengage from the container while a force is applied to the blocking element; wherein when the blocking element is disengaged from the container, the pushing element is moved from the initial position to a release position by the movement of the pad to unlock the battery.

8. The portable electronic device as claimed in claim 7, wherein the blocking element comprises at least one fastening structure, the at least one fastening structure is located correspondingly on at least one side of the blocking element, and the blocking element is fastened in the container via the at least one fastening structure while the force is not applied to the blocking element.

9. The portable electronic device as claimed in claim 7, wherein the container comprises a recessed structure located on a side of the container next to the blocking element, the recessed structure is used for facilitating a user to apply the force to the blocking element to disengage from the container.

10. The portable electronic device as claimed in claim 7, further comprising an elastic element, two ends of the elastic element being connected to the pushing element and the housing respectively, and the pushing element being returned to the initial position from the release position by an elastic restoring force of the elastic element.

11. The portable electronic device as claimed in claim 7, wherein the blocking element is made of an elastic material.

12. The portable electronic device as claimed in claim 7, wherein the container comprises a slide hole, the fixed member passes through the slide hole to connect to the pushing element.

* * * * *